United States Patent [19]

Boles

[11] Patent Number: 4,546,354
[45] Date of Patent: Oct. 8, 1985

[54] RANGE/AZIMUTH SHIP IMAGING FOR ORDNANCE CONTROL

[75] Inventor: Sol Boles, Syosset, N.Y.

[73] Assignee: Grumman Aerospace Corporation, Bethpage, N.Y.

[21] Appl. No.: 389,367

[22] Filed: Jun. 17, 1982

[51] Int. Cl.[4] .............................................. G01S 13/90
[52] U.S. Cl. .................................. 343/17; 343/5 CM; 343/7 ED
[58] Field of Search ................... 343/5 CM, 17, 7 ED, 343/5 SA, 8, 7.7, 16 M; 364/516, 517

[56] References Cited

U.S. PATENT DOCUMENTS

| | | | |
|---|---|---|---|
| 2,996,706 | 8/1961 | Newell et al. | 343/7 ED |
| 3,453,619 | 7/1969 | Wright | 343/8 |
| 3,610,901 | 10/1971 | Lynch | 343/5 DP X |
| 3,733,603 | 5/1973 | Johnston | 343/5 SA |
| 3,735,399 | 5/1973 | Slehen et al. | 343/5 CM X |
| 3,735,400 | 5/1973 | Sletten et al. | 343/7.7 |
| 3,798,425 | 3/1974 | Heard et al. | 343/5 DP X |
| 3,806,929 | 4/1974 | Moore | 343/5 SA |
| 3,927,405 | 12/1975 | Poinsard et al. | 343/5 CM |
| 3,983,558 | 9/1976 | Rittenbach | 343/7.7 |
| 3,987,440 | 10/1976 | Danzer | 343/7 A |
| 3,987,442 | 10/1976 | McLeod, Jr. | 343/7.7 |
| 3,993,994 | 11/1976 | Goggins | 343/5 CM |
| 4,068,231 | 1/1978 | Wilmot | 343/5 CM |
| 4,086,590 | 4/1978 | Goggins, Jr. | 343/5 CM |
| 4,101,890 | 7/1978 | Goyard | 343/8 |
| 4,101,891 | 7/1978 | Jain et al. | 343/17.22 PC |
| 4,134,113 | 1/1979 | Powell | 343/5 CM |
| 4,442,431 | 4/1984 | Bleakney | 33/5 CM X |

Primary Examiner—T. H. Tubbesing
Assistant Examiner—Gilberto Barrón Jr.
Attorney, Agent, or Firm—Richard G. Geib; Daniel J. Tick; Bernard S. Hoffman

[57] ABSTRACT

Distortions inherent in the formation of a range/doppler image by an airborne Synthetic Aperture Radar (SAR) of a ship under the influence of roll, pitch, and yaw motions characteristic of a sea state conditions, are removed by the formation of a scaled range/azimuth image generated with the use of an interferometer antenna in conjunction wth the SAR. A least squares linear regression solution to doppler processed interferometric azimuth angle data derived from ship radar reflections permits the determination of aircraft to ship relative rotational motion essential to the development of such an improved high resolution radar image, so that continuous automatic tracking of a cursor imbedded in a single designate resolution cell of the ship's displayed image essential to carrying out precision standoff command weapon guidance to that selected ship target cell, can be accomplished.

7 Claims, 7 Drawing Figures

RANGE/AZIMUTH SHIP IMAGING FOR ORDNANCE CONTROL

BACKGROUND OF THE INVENTION

The present invention relates to radar controlled weapons systems and, more particularly, to a method and apparatus for generating real-time high resolution Synthetic Aperture Radar (SAR) imagery from an airborne platform of a translating ship under the influence of roll, pitch, and yaw motions characteristic of sea state conditions.

A highly resolved ship image on an airborne display permits targeting to a particular part of the ship for the purpose of standoff command guidance weapon delivery. As such, this invention relates to airborne SAR systems used for generating real-time high resolution imagery of a ground target area and for accurately measuring and tracking the range and azimuth angle of a designated single non-emitting stationary or moving target cell within the aforesaid displayed target area so as to enable the accurate delivery of an air-to-ground missile or glide bomb from the SAR bearing aircraft to said target. A system for accomplishing the above has previously been described in a commonly assigned co-pending U.S. patent application of Sol Boles and Walter J. Smrek, Ser. No. 373,806, filed Apr. 30, 1982, entitled, "Moving Target Ordnance Control", the disclosure of which is incorporated herein by reference.

As disclosed in the aforementioned application of Boles and Smrek, a missile or glide bomb is brought to the start of a near-vertical terminal trajectory by inertial or radio location mid-course guidance techniques. In the terminal guidance phase, an interferometer antenna system is used in conjunction with a synthetic aperture radar and associated signal processing equipments to perform measurements of the relative range and azimuth angle between the weapon and a ground target designated by the operator on a high resolution real-time synthetic aperture ground map display. A command guidance channel from aircraft to weapon uses this sensor derived information to command the weapon trajectory in such a way as to drive the relative range and azimuth separation to zero so that the weapon impacts the target.

According to contemporary art, the generation of SAR imagery is predicated on the fact that when an aircraft flies over fixed terrain, a frequency gradient at constant range due to aircraft motion is produced. The processing of the integrated signal received from a small fixed range increment over a specified time interval through a contiguous doppler filter bank, after the application of suitable phase corrections of all such incoming signals required because of aircraft motion, enables the resolution of signal returns from amongst closely separated scatterers distributed in the azimuth dimension. Similar processing of signals received from closely separated contiguous range intervals permits the formation of an intensity plot on a CRT of the signals received from all scatterers in a range versus azimuth coordinate frame, consistent with the resolution limits of the system. Furthermore, the designation of any resolution cell within the map so formed, permits the measurement interferometrically of the azimuth angle of that cell to be used for command guidance of a weapon as described earlier. Resolution in the range direction depends straight-forwardly upon transmitted pulse width and the sampling rate of the received signal. Resolution in the cross-range, or azimuth direction, depends upon knowledge of aircraft cross line-of sight velocity, a measure of the rotation rate of the line-of-sight about the focus point so that doppler filter bandwidths and filter spacings can be preset in terms of desired azimuth angular resolution. Furthermore, the designation of any resolution cell within the map so formed by the placement of a cursor on the display derived from the mixing of injected artificial range and doppler signals with ground target video, permits the measurement interferometrically of the azimuth angle of the target cell as identified by the cursor, to be used for command guidance of a weapon as described earlier. Weapon impact accuracy requirements dictate that target tracking in range and azimuth be carried out over successive apertures during the weapon guidance to impact. This requires, in turn, that the cursor location on the range/doppler map be driven so that it remains on the designated target, so that the range and interferometric azimuth angle of the target are identified in a continuous manner. Such cursor tracking is accomplished on the basis of on-board sensor derived navigational measurements as the aircraft changes location with respect to the fixed ground terrain.

For the case of a ship undergoing roll, pitch, and yaw in sea state conditions, however, the net frequency gradient of the signal return within a given range bin becomes substantially determined by ship scatterer motion and could be markedly different from that due to aircraft motion alone. Moreover, as described in more detail below, the ship rotational motions accompanying sea state conditions can produce severe distortions in range/doppler ship imagery, thereby seriously undermining ship recognition capability and the successful execution of standoff command weapon guidance to a designated ship target cell using relative range and azimuth guidance techniques as delineated herein.

In view of the foregoing, it should be apparent that the known techniques which utilize the frequency gradient due to aircraft motion alone are unacceptable for generating real-time high resolution SAR imagery from an airborne platform of a translating ship under the influence of sea state conditions.

It is accordingly a general object of the present invention to overcome the aforementioned limitations and drawbacks associated with existing systems.

It is a specific object of the present invention to provide a method and apparatus for generating high resolution synthetic aperture radar displayed imagery of a ship under the influence of sea state conditions.

It is another object of the present invention to provide a method and apparatus for deterring the cross line-of-sight relative velocity associated with aircraft and ship rotational rates, requisite to achieving prescribed cross-range (azimuth) resolution in the displayed image representation of the ship.

It is a still further object of the present invention to provide method and apparatus for eliminating the distortions inherent in range/doppler ship imagery brought about by ship rotational motions accompanying sea state conditions by forming a scaled SAR high resolution range/cross-range (azimuth) image projection of the ship on the basis of interferometric azimuth angle measurements derived from doppler processed range sampled data, so as to permit the cursoring and tracking of a particular range/azimuth resolution cell of the ship target for the purpose of carrying out standoff command guidance weapon delivery to said target.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for forming, in conjunction with an airborne synthetic aperture radar system having an interferometer antenna and a range versus azimuth angle display, a range/azimuth image having improved azimuth resolution of a ship target under the influence of sea state conditions.

In accordance with the teachings of the invention, a range/azimuth image having improved azimuth resolution of a ship target under the influence of sea state conditions is formed by processing the received signals from the scatterers comprising the ship target to obtain an estimate of the net doppler producing cross line-of-sight velocity of the radar bearing aircraft relative to the ship, and determining from the estimated cross line-of-sight relative velocity the values of predetermined system parameters to be used predictively in the succeeding coherent integration interval in forming the range/azimuth image.

BRIEF DESCRIPTION OF THE DRAWINGS

Serving to illustrate an exemplary embodiment of the invention are the drawings of which.

DETAILED DESCRIPTION OF THE PREFERRED EMBODIMENT

In order to provide for a better understanding and background of the present invention, it will be useful to describe and discuss briefly the contemporary art and some of its resulting problems.

Figure 1:
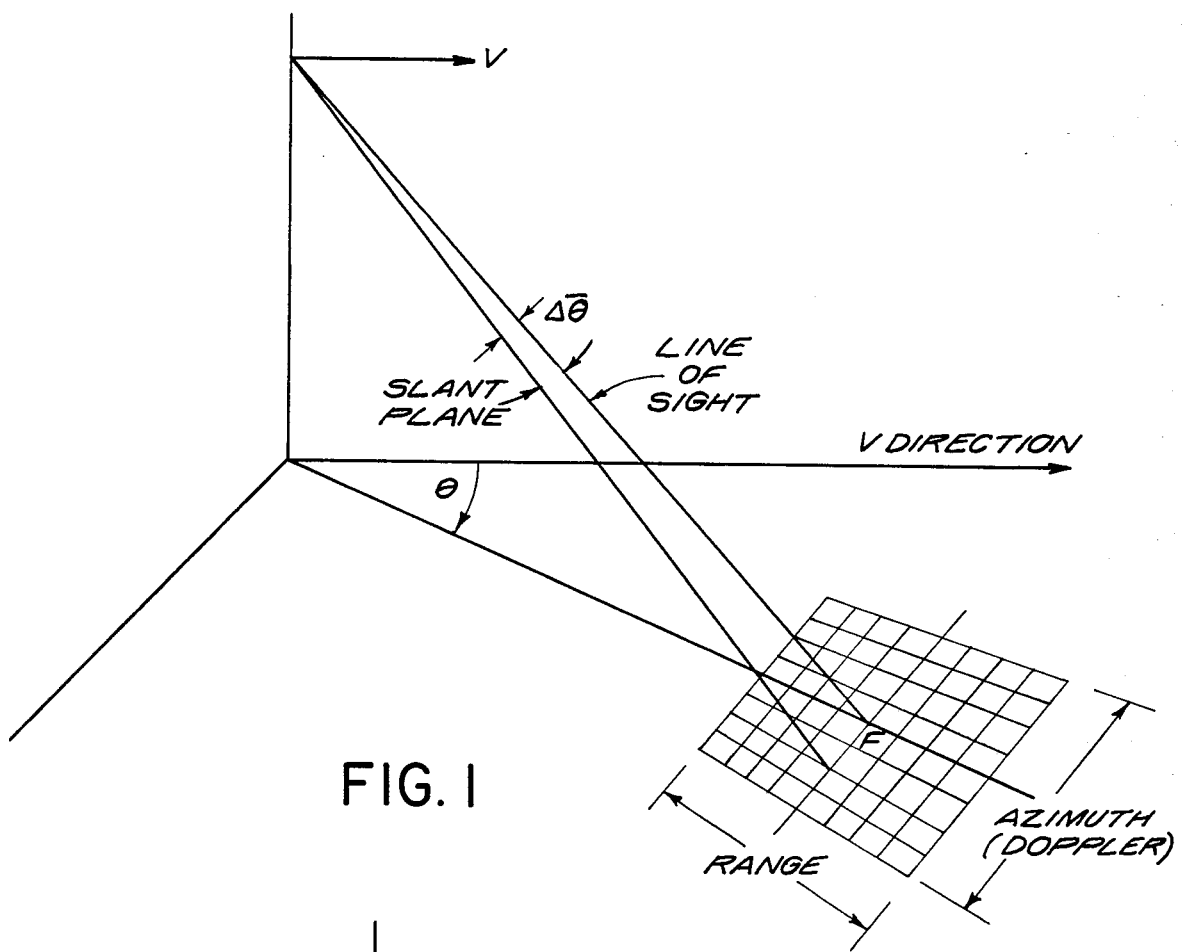
FIG. 1 illustrates aircraft and ground target geometrical relationships governing the formation of a synthetic aperture radar range/doppler image.

Referring to FIG. 1 the aircraft and ground target geometrical relationships governing the formation of a synthetic aperture radar range/doppler image are illustrated. As shown therein, the generation of SAR imagery is predicated on the fact that when an aircraft flies over fixed terrain, a frequency gradient at constant range due to doppler shift is produced, given by $df/d\theta = -2V \sin\theta/\lambda$, where V = aircraft velocity, assumed horizontal, and f and $\theta$ are doppler shift frequency and azimuth angle measured in the slant plane, respectively, associated with focus point, F, and $\lambda$ = radar system operating wavelength. As noted previously, the frequency gradient is due entirely to aircraft motion.

Figure 2:
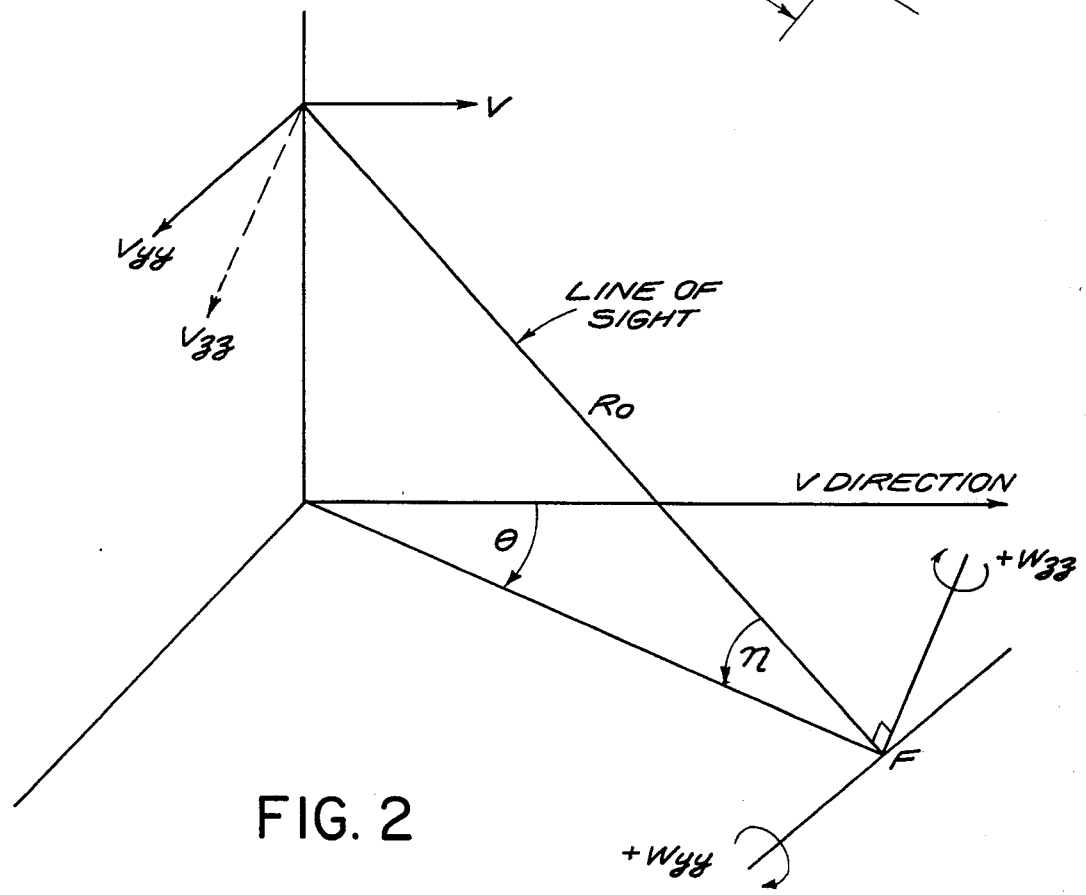
FIG. 2 illustrates aircraft and ship target geometrical and motional relationships governing the formation of a range/doppler or range/azimuth ship image.

Referring now to FIG. 2, the aircraft and ship target geometrical and motional relationships governing the formation of a range/doppler or range/azimuth ship image are illustrated. As shown therein, $V_{yy}$ represents the (horizontal) cross line-of-sight velocity, $-V\sin\theta$, and $V_{zz}$ is the aircraft velocity component orthogonal to both $V_{yy}$ and the radar line-of-sight to the center of rotation tracking point of the ship, designated as point F. It is observed that ship rotation about the $W_{zz}$ axis (parallel to the $V_{zz}$ direction) now influences the net line-of-sight rotation of the airborne SAR with respect to ship scatterers in the vicinity of focus point F, which was previously determined solely by aircraft cross line-of-sight velocity, $V_{yy}$. Processing of this data to produce a realistic and scaled image of the ship would first require setting filter bandwidths and frequency separations in terms of the net doppler frequency gradient including ship motion, rather than aircraft motion alone. Since ship rotations are normally not known, image resolution cannot be fixed, and consequently, scaling of the image along the doppler dimension is unknown, thereby producing a serious deficiency when attempting ship classification. Also, severe distortions in the displayed ship image can also result, depending upon the instantaneous values of ship rotations, designated by $W_{zz}$ and $W_{yy}$ (parallel to the $V_{zz}$ direction).

Figure 3A:
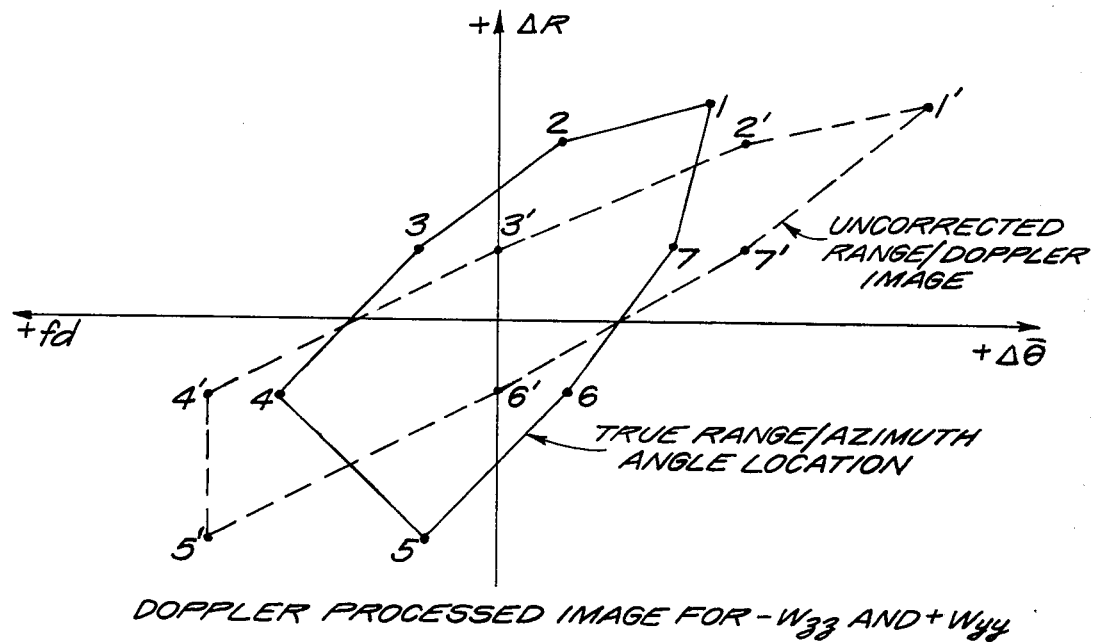
FIG. 3A depicts the distortion inherent in a range/doppler ship image for assumed rotation rates of $-W_{zz}$ and $+W_{yy}$, as represented in FIG. 2.
Figure 3B:
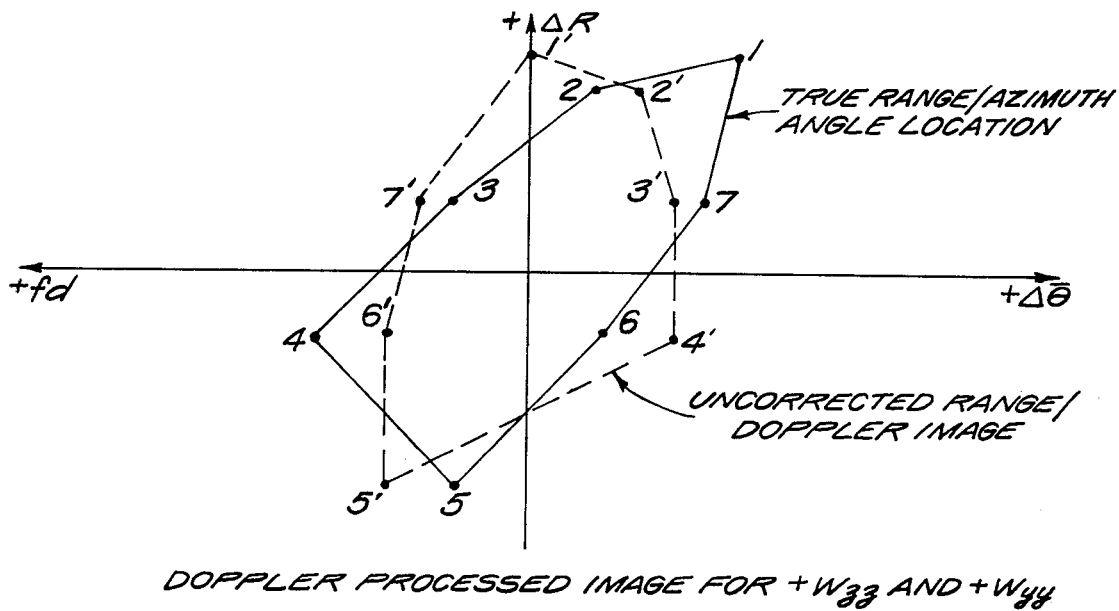
FIG. 3B depicts the distortion inherent in a range/doppler ship image for assumed rotation rates of and $+W_{zz}$ and $+W_{yy}$, as represented in FIG. 2.

FIG. 3A illustrates the distortion inherent in a range/doppler image representation of a hypothetical ship image for assumed ship rotational rates of $-W_{zz}$ and $W_{yy}$, where the ship rotations are assumed greater than those resulting from aircraft motion. Similarly, FIG. 3B depicts the distortion inherent in the range/doppler representation, where the sign of $W_{zz}$ has been reversed. It is to be noted that in addition to being distorted, the image is inverted along the doppler direction. Furthermore, since the range/doppler image representation is an ever changing one from aperture to aperture in terms of the essential ship rotational rates denoted by $W_{yy}$ and $W_{zz}$, it is not possible to continuously implant a cursor into an appropriate doppler filter from aperture to aperture for purposes of continuously tracking a designated ship target resolution cell, prerequisite to successfully carrying out command weapon guidance analogously to ground target weapon delivery, because of the ever-changing, and unpredictable, nature of the target cell's doppler frequency.

In light of the foregoing, it is apparent that ship rotational motions accompanying sea state conditions can produce severe distortions in range/doppler ship imagery, thereby seriously undermining ship recognition capability and the successful execution of standoff command weapon guidance to a designated ship target cell using relative range and azimuth guidance techniques as delineated herein.

Figure 4:
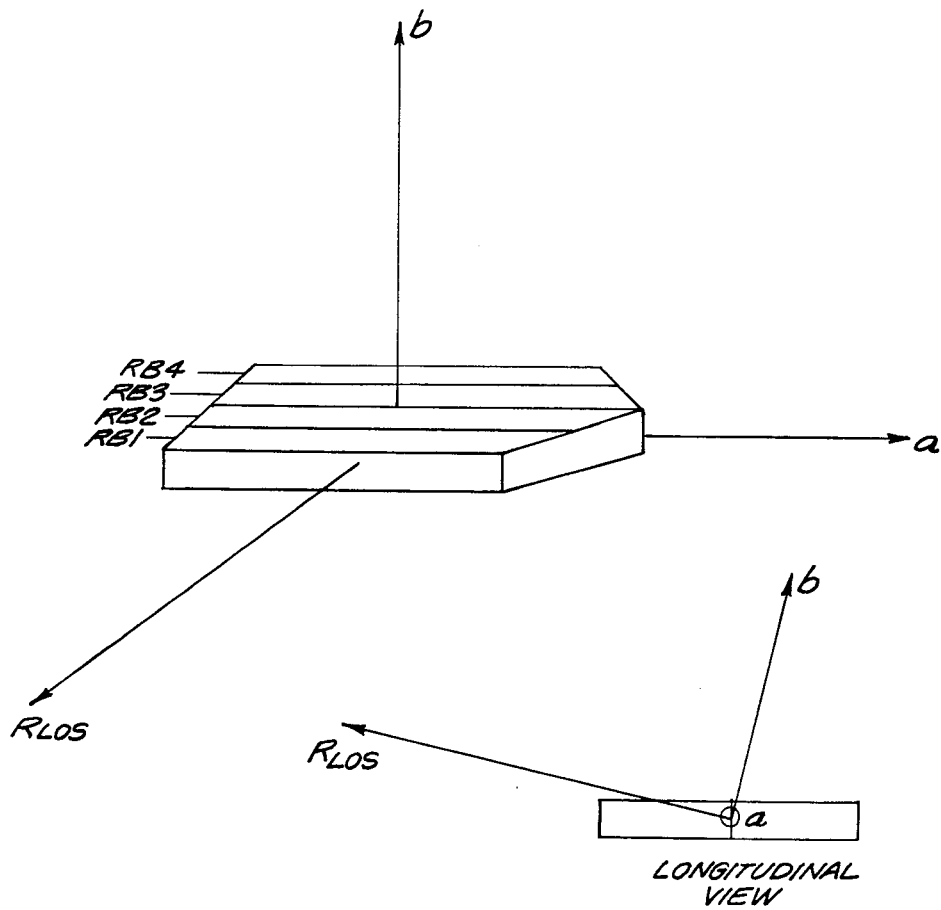
FIG. 4 illustrates the formation of equal doppler gradients over various range bins in the presence of ship rotational motions.

FIG. 4 illustrates the formation, in accordance with the teachings of the present invention, of equal doppler gradients over various range bins in the presence of ship rotational motions. As shown therein, the radar line-of-sight is denoted by $R_{LOS}$ and range bins, RB1, RB2, RB3, and RB4, by way of illustration, are generated by the range sampling of the signals reflected from the ship target. Ship rotational motion can be resolved into rotations about 2 orthogonal axes, a and b, both perpendicular to the radar line-of-sight, $R_{LOS}$, as shown.

For a ship surface contour which does not sensibly vary in elevation, rotation about the "b" axis produces a doppler gradient as a function of the cross line-of-sight dimension (azimuth) in each range bin, of constant slope for each range bin, whose slope magnitude is proportional to the assumed rotational rate. Rotation about the "a" axis produces a constant doppler shift throughout each range bin but which varies linearly from range bin to range bin depending upon the distance of the range bin from the axis of rotation, "a". The net observed effect, therefore, is the composite of the two rotations. In terms of the nomenclature of FIG. 2, the doppler gradient in each range bin can be represented by $$f_d = \frac{2}{\lambda}(V_{yy} + W_{zz}R_o)\overline{\Delta\theta}. \tag{1}$$

where $f_d$ is doppler shift, $R_o$ is the slant range, and $\Delta\theta$ is azimuth angle with respect to boresight, which is located at focus point F. Defining, $$V'_{yy} \equiv V_{yy} + W_{zz}R_o, \tag{2}$$

where $V'_{yy}$ is the net horizontal cross line-of-sight velocity due to both aircraft and ship translational motion, equation (1) is rewritten, $$\overline{\Delta\theta} = \left(\frac{\lambda}{2V'_{yy}}\right)f_d, \tag{3}$$

which depicts the linear relationship between doppler shift and azimuth angle in a given range bin.

By plotting the interferometrically determined azimuth angle, $\Delta\theta$, obtained for each doppler filter in a given range bin, versus the filter doppler frequency, $f_d$, a least squares regression fit can be performed to determine the best straight line through the points. Accordingly, from equation (3), the slope of the line, M, is a measure of $\lambda/2V'_{yy}$, so that the net doppler producing cross line-of-sight velocity including ship rotation, $V'_{yy}$, can be determined, from which prescribed azimuth resolution, $d_{az}$, SAR coherent integration time, T, and doppler filter bandwidth and spacing, can be established.

The slope Mr, of the best straight line fit to all doppler/azimuth angle measurement points in range bin, r, is found from standard formulas for a weighted least squares linear regression, i.e., $$Mr = \frac{(\Sigma w_i)\Sigma(w_i f_i \theta_i) - (\Sigma w_i f_i)(\Sigma w_i \theta_i)}{(\Sigma w_i)(\Sigma w_i f_i^2) - [\Sigma w_i f_i]^2}, \tag{4}$$

where $f_i$ and $\theta_i$ represent the i th coordinate pair, doppler frequency and interferometric azimuth angle, respectively, and $w_i$ is a relative weighting factor proportional to signal power in the i th filter.

An improved slope estimate can be obtained by smoothing (averaging) the slope values obtained over all range bins, (r=1, 2, 3, ..., R), since normal system noise can be expected to produce some residual slope uncertainty. Accordingly, the smoothed slope estimate, M, is found from, $$M = \frac{M_1 + M_2 + M_3 + \ldots + M_R}{R}. \tag{5}$$

From equation (3), which relates doppler frequency to azimuth angle through the parameter, M, the filter bandwidth, BW, (and spacing), for prescribed azimuth resolution, is obtained. Therefore, $$BW = \left|\left(\frac{1}{M}\right)(\theta)\,res\right|, \tag{6}$$

where $(\theta)$ res = desired azimuth angular resolution. Since $$d_{az} = R_o(\theta)\,res,$$

where $d_{az}$ = desired cross range resolution, $$BW = \left|\frac{d_{az}}{MR_o}\right|. \tag{7}$$

Also, the matched SAR integration time, T, is found from, $$T = 1/BW. \tag{8}$$

Integration time, filter bandwidth and spacing are used predictively for the next aperture to be formed. Data is processed during the aperture interval immediately following that during which it is collected and is presented for display immediately thereafter. The displayed image is in scaled range and cross-range (azimuth) coordinates and at prescribed resolution along both dimensions. The image is also refreshed at the aperture rate.

As the SAR carrying aircraft and the ship target can both be undergoing translation, it is desirable to steer the pointing of the antenna boresight in both azimuth (cross-range) and slant range directions to provide proper illumination of the target and requisite measurement stability during the synthetic aperture interval. Azimuth steering commands are generated on the basis of inertially derived aircraft navigational measurements, to which are added incremental commands so that the average of the interferometrically determined azimuth angle measurements associated with the e sential ship scatterers is maintained at zero (with respect to boresight) as the ship is tracked through successive apertures, thereby directing the antenna boresight to the center of rotation of the ship.

Similarly, motion compensation phase corrections are applied to incoming signals on a pulse-to-pulse basis, predicated on inertial sensor derived aircraft navigational measurements and subject to the requirement that the average doppler frequency from all essential ship scatterers is maintained at zero from aperture to aperture.

The motion compensation phase change as a function of time, is therefore, a measure of the relative displacement rate, or range rate, between aircraft and ship target, and is therefore used to control the depression angle, $\theta$, (see FIG. 2) to the ship target. This derived relative range rate is also used to control the initiation of range sampling from one pulse to the next so that corresponding range samples from one pulse to the next correspondings to the same range increment, a requirement for the achievement of desired range resolution and maximum processing gain over the coherent integration interval.

The generation of a high resolution range/azimuth ship image permits the placement of a cursor at the location within the image of a particular resolution cell constituting the designated target cell. To carry out command weapon guidance to its ultimate accuracy capability, requires that the cursor location be tracked through a succession of images so as to be continuously superimposed over the initially designated resolution cell.

Figure 5:
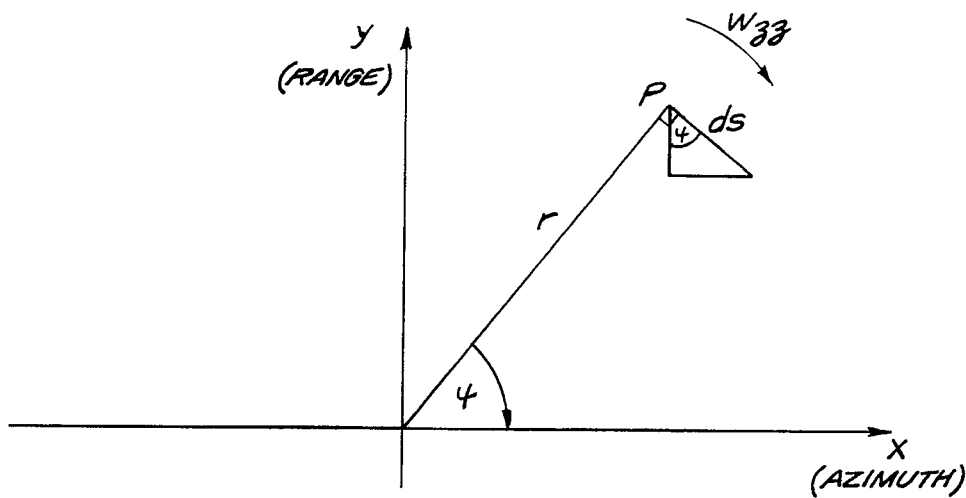
FIG. 5 illustrates the geometry governing the formulation of cursor corrections for ship yaw motion.

Referring to FIG. 5, the geometry governing the formulation of cursor corrections for ship yaw motion is illustrated. As shown therein, point P represents a hypothetical target cell in a range (y) versus azimuth (x) coordinate frame. As time progresses, cursor tracking of target cell P is normally accomplished in term of its predicted range/azimuth location referenced to the SAR bearing aircraft on the basis of the derived relative translation between aircraft and ship from aperture to aperture. As a result of a ship rotational component, $W_{zz}$, however, brought about principally by ship yaw motion, a target cell near the ship extremity, initially under the cursor at P, would appear to be rotating with respect to the cursor as time progressed, thereby producing significant cursor offset and consequent weapon delivery error.

An additional tracking correction can be applied to the cursor location to eliminate this potential error source by recognizing that the ship rotational component, $W_{zz}$, can be learned from the regression solution for $V'_{yy}$, discussed previously. The change in angle $\psi$, $d\psi$, as a function of an incremental change in time, dt, where $\psi$ is measured by the initial location of the designated target cell, is given by, $$d\psi = \int W_{zz} dt \quad (9)$$

Also, $$ds = r\, d\psi, \quad (10)$$

$$dy = -ds\, \cos\psi \quad (11)$$

and $$dx = ds\, \sin\psi, \quad (12)$$

where $$\cos\psi = x/r, \quad (13)$$

and $$\sin\psi = y/r \quad (14)$$

Combining equations (9) through (14) results in, $$dy = -x \int W_{zz} dt \quad (15)$$

and $$dx = y \int W_{zz} dt \quad (16)$$

Equations (15) and (16) represent respectively, the corrections in range and azimuth, after an increment of time, dt, for an initial target cell location in range and azimuth of y and x with respect to the ship's center of rotation. The value of $W_{zz}$ to be used in equations (15) and (16) is obtained from equation (2), where $V'_{yy}$ is obtained from the regression solution to the body of processed range/doppler/azimuth measurements, and for known estimates of $V_{yy}$ and $R_o$. The cursor corrections can be made on an aperture-to-aperture basis, wherein, therefore, dt represents the coherent integration interval since the previous correction.

Significant signal returns from ship scatterers at different elevation angles, such as from the mast of a ship, could produce data points that are considerably dispersed from the straight line fit to interferometric azimuth angle versus doppler frequency data due to their additional doppler influencing velocities, brought about by ship rotation about axis "a" in FIG. 4. This could conceivably degrade the accuracy of the regression solution for cross line-of-sight velocity, $V'_{yy}$, requisite to achieving the goals of this invention to the fullest extent possible. Such effects can be minimized by excluding any data points outside of a prescribed threshold band about the least squares fit formed from all available data points, and refitting to the data after such exclusion. Should an elevation interferometer also be implemented into the system in addition to azimuth, then elevation measurements can also be used as an added discriminant in the exclusion process.

Figure 6:
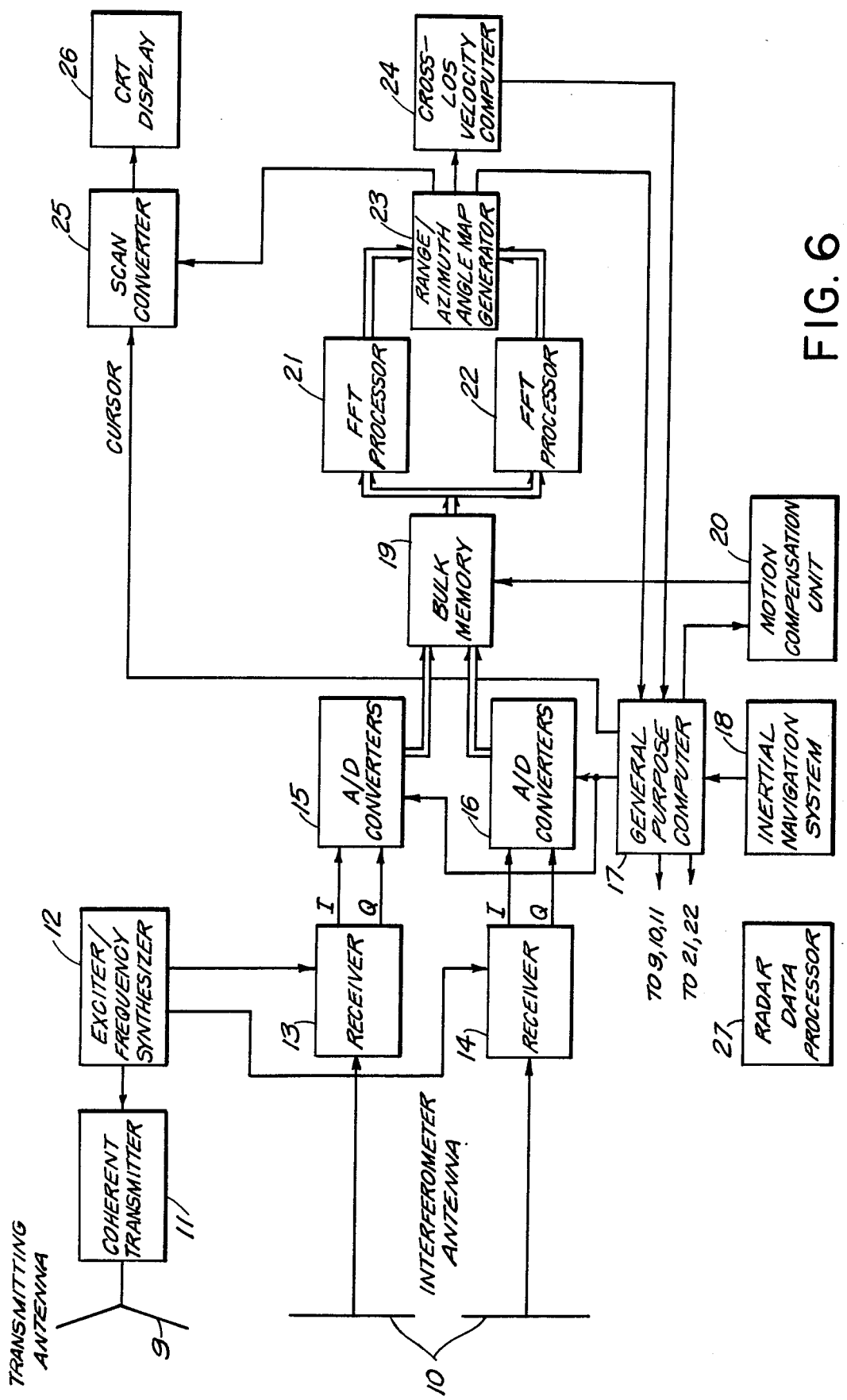
FIG. 6 is a block diagram illustrating the physical embodiments of the present invention.

Referring now to FIG. 6, a block diagram of the preferred embodiment of the system utilized for practicing the present invention is illustrated. As shown therein, pulses of electromagnetic energy generated in Coherent Transmitter 11 from reference signals derived in Exciter/Frequency Synthesizer 12 are radiated from Transmitting Antenna 9 so as to optimally illuminate a ship target under way on the surface of the sea. Signals reflected from the ship target are received by Interferometer Antenna 10 comprised of two separat receiving elements whose common boresight direction corresponds to that of Transmitting Antenna 9. Reference signals from Exciter/Frequency Synthesizer 12, coherent with the transmitted signal, are applied to Receivers 13 and 14 to demodulate the target signals received by the interferometer elements t quadrature related I and Q doppler shifted components, which represent the real and imaginary components of the instantaneous analog signal vectors out of the receivers. These analog signal components are digitized in the A/D Converters 15 and 16 at a sampling rate determined by system range resolution requirements. These digitized samples, representing separately the signals received by the two interferometer elements, are stored in Bulk Memory 19 on a pulse-to-pulse basis. Concurrently, motion compensation corrections for antenna phase center translational and rotational motions, as well as for ship translational motion, are computed and stored in Motion Compensation Unit 20 in a time sequenced order on the basis of computations performed in General Purpose Computer 17 of the two-way line-of-sight displacement change between antenna phase centers and the center of rotation tracking point of the ship, predicated on driving the average doppler of all ship scatterers to zero, as determined in Range/Azimuth Angle Map Generator 23.

At the end of the coherent integration interval for which data is being collected, corrections stored in Motion Compensation Unit 20 are applied to the time sequences stored in Bulk Memory 19 in the form of vector rotations reflecting the twoway motion compensation phase correction to each range sample of each pulse of the (2) sequences representing signals received at the two interferometer halves over the coherent integration interval. After motion compensation correction, data is read out of Bulk Memory 19 (as new data is being entered) for Fourier Transform digital signal processing to produce the necessary filtering so as to provide the desired azimuth resolution in each range bin. The filtering is performed in FFT Processors 21 and 22 which perform Fast Fourier Transform digital processing so as to produce azimuth resolved coherently integrated vector sums in each doppler filter of each range bin. The range/doppler maps generated in FFT Processors 21 and 22 are inputted to Range/Azimuth Angle Map Generator 23 where a phase comparison is made between corresponding range/doppler cells in the two maps on a cell-by-cell basis, of each and every resolution cell of the two maps, to yield the interferometric azimuth angle of the signal received in each such resolution cell, in accordance with well known interferometric principles, i.e., $\Delta\theta = \sin^{-1}[(\lambda/2\pi d)\phi]$, where $\Delta\theta$ is the azimuth spatial angle, d is the interferometer baseline spacing, and $\phi$ is the measured electrical phase. Only those cells whose vector amplitudes exceed a prescribed threshold are used in the interferometric phase comparison, so as to eliminate excessive glint (azimuth mislocation) in the displayed image, which otherwise would have been brought about by such weaker signals. The range/azimuth map of the ship target so formed, is stored in Scan Converter 25 for summation with cursor video signals generated in Scan Converter 25, and for image intensity scaling, prior to inputting to CRT Display 26 for image presentation of the ship target.

In addition, the range/azimuth matrix generated in Range/Azimuth Angle Map Generator Z3 is also inputted to Cross LOS (Line-Of-Sight) Velocity Computer 24, in which a weighted least squares linear regression straight line fit is performed in each range bin, in accordance with the teachings of this invention, and as exemplified by equation (4), to yield the slope of the azimuth angle/doppler distribution, Mr, in each such range bin, and then subsequently, an improved estimate, M, by averaging over all range bins, as exemplified by equation (5). This estimated slope value, M, is inputted to General Purpose Computer 17, for the establishment of filter bandwidth (and frequency separation), BW, and integration time, T, in accordance with equations (7) and (8), to govern the formation of prescribed azimuth resolution in the succeeding coherent integration interval.

Antenna azimuth steering commands ar generated in General Purpose Computer 17 on the basis of aircraft navigational data inputs from the Inertial Navigation System 18 and averaged interferometric azimuth angle measurements from the various ship scatterers provided by Range/Azimuth Angle Map Generator 23, in such a manner as to maintain the average of all interferometric azimuth angles at zero (with respect to its electrical boresight) when smoothed with a tracking filter in General Purpose Computer 17 over successive apertures. The net pulse-to-pulse two-way line-of-sight displacement change due to relative translational motion between aircraft and ship computed in General Purpose Computer 17 for purposes of motion compensation, also serves as a basis for controlling the precise timing for the start of range sampling at A/D Converters 15 and 16, so that corresponding samples from pulse-to-pulse over the coherent integration interval represent the same range increment of the ship.

Cursor placement to a desired resolution cell of the ship image is achieved by operator designation of video signals through General Purpose Computer 17 and applied to Scan Converter 25. Cursor tracking of the designated ship target resolution cell during the weapon delivery phase is similarly controlled by General Purpose Computer 17 on the basis of its computations of target cell range and azimuth angle change with time derived from its navigational solutions for translational motions between aircraft and ship, as well as on the basis of its solution for ship rotational rate, $W_{zz}$, for which additional range and azimuth corrections, dy and dx, in accordance with equations (15) and (16), are computed and applied to Scan Converter 25. Estimation of $W_{zz}$ is made with the use of equation (2) in General Purpose Computer 17, wherein $V'_{yy}$ is determined from the regression solutions in Cross LOS Velocity Computer 24, and where $V_{yy}$ and $R_o$ are determined in General Purpose Computer 17 on the basis of aircraft inertial measurements and ship target tracking data obtained from Range/Azimuth Map Generator 23.

Control signals for the pointing of Antennae 9 and 10 and for pulse repetition frequency (prf) control of coherent Transmitter 11 are obtained from General Purpose Computer 17. All task management such as data transmission and initiation of subroutine sequences, are performed by the Radar Data Processor 27.

Although separate transmitting and receiving antennae have been illustrated in the block diagram of FIG. 6, both transmitting and receiving functions could be combined into a single aperture. All elements in the block diagram can be either manufactured or purchased as separate commercial entities and incorporated into the embodiments of this invention by those skilled in the art. Also, many of the functional units shown separately in FIG. 6 can be combined for purposes of design economy.

Thus, although the invention has been described and illustrated in detail, it is to be understood that the same is exemplary and is not to be taken by way of limitation, the spirit and scope of this invention being limited only by the terms of the appended claims.

What is claimed is:

1. In conjunction with an airborne synthetic aperture radar system having an interferometer antenna and a range versus azimuth angle display, a method for forming with improved azimuth resolution a scaled range/azimuth image of a ship target under the influence of sea state conditions comprising the steps of:
   (a) steering the pointing of the interferometer antenna boresight to provide radar illumination of the ship target;
   (b) controlling the range sampling timing so that corresponding samples from pulse-to-pulse over the coherent integration interval correspond to the same range increment of the ship target;
   (c) compensating for phase variations in the received signals due to the respective motions of the radar bearing aircraft and the ship;
   (d) measuring interferometrically the compensated received signals for each doppler filter in each range bin;
   (e) plotting as interferometer azimuth angle versus filter doppler frequency the measured data for each doppler filter in each range bin;
   (f) performing a weighted least squares linear regression straight line fit to the plotted data points of the azimuth angle/doppler distribution for each range bin;

(g) determining the slope of the straight line fit to the azimuth angle/doppler distribution for each range bin;

(h) averaging the slope values determined over all range bins; and (i) determining from the averaged slope value the values of predetermined system parameters including synthetic aperture radar integration time and doppler filter bandwidths and spacings to be used predictively in the succeeding coherent integration interval in forming the range/azimuth image.

2. A method as recited in claim 1 including the further steps of:
(a) displaying the formed range/azimuth image of the ship target on the range versus azimuth angle display;
(b) cursoring a designated range/azimuth resolution cell of the displayed image of the ship target; and
(c) tracking from aperture to aperture the designated resolution cell of the ship target.

3. A method as recited in claim 2 including the further step of applying to the cursor location on an aperture to aperture basis a tracking correction to compensate for the rotation of the ship about an axis orthogonal to both the aircraft horizontal cross line-of-sight velocity and the radar line-of-sight to the center of rotation tracking point of the ship.

4. A method as recited in claim 3 including the further steps of excluding any data points located outside of a prescribed threshold band about the least squares fit formed from all available data points of the azimuth angle/doppler distribution for each range bin; and refitting to the data after such exclusion.

5. In conjunction with an airborne synthetic aperture radar system having an interferometer antenna and a range versus azimuth display, a method for forming with improved azimuth resolution a range/azimuth image of a ship target under the influence of sea state conditions comprising the steps of:
(a) processing the received signals from the scatterers comprising the ship target to obtain an estimate of the net doppler producing cross line-of-sight velocity of the radar bearing aircraft relative to the ship;
(b) determining from the estimated cross line-of-sight relative velocity the values of predetermined system parameters to be used predictively in the succeeding coherent integration interval in forming the range/azimuth image;
(c) displaying the formed range/azimuth image of the ship target on the range versus azimuth display;
(d) cursoring a designated range/azimuth resolution cell of the displayed image of the ship target;
(e) tracking from aperture to aperture the range and interferometrically determined azimuth of the designated resolution target cell;
(f) compensating for phase variations in the received signals due to the respective motions of the radar bearing aircraft and the ship;
(g) steering the pointing of the interferometer antenna boresight to provide radar illumination of the ship target;
(h) controlling the range sampling timing so that corresponding range samples from pulse-to-pulse over the coherent integration interval correspond to the same range increment of the ship target;
(i) applying to the cursor location on an aperture to aperture basis a tracking correction to compensate for the rotation of the ship about the axis orthogonal to both the aircraft horizontal cross line-of-sight velocity and the radar line-of-sight to the center of rotation tracking point of the ship; and
(j) processing the compensated received signals by:
(1) measuring interferometrically the compensated received signals for each doppler filter in each range bin;
(2) plotting an interferometer azimuth angle versus filter doppler frequency the measured data for each doppler frequency in each range bin;
(3) performing a straight line fit to the plotted data points of the azimuth angle/doppler distribution for each range bin;
(4) determining the slope of the straight line fit to the azimuth angle/doppler distribution for each range bin;
(5) averaging the slope values determined over all range bins; and
(6) obtaining from the averaged slope value an estimate of the net doppler producing cross line-of-sight velocity of the radar bearing aircraft relative to the ship.

6. In conjunction with an airborne synthetic aperture radar system having an interferometer antenna and a range versus azimuth display, a method for forming with improved azimuth resolution a range/azimuth image of a ship target under the influence of sea state conditions comprising the steps of:
(a) processing the received signals from the scatterers comprising the ship target to obtain an estimate of the net doppler producing cross line-of-sight velocity of the radar bearing aircraft relative to the ship;
(b) determining from the estimated cross line-of-sight relative velocity the values of predetermined system parameters to be used predictively in the succeeding coherent integration interval in forming the range/azimuth image;
(c) displaying the formed range/azimuth image of the ship target on the range versus azimuth display;
(d) cursoring a designated range/azimuth resolution cell of the displayed image of the ship target;
(e) tracking from aperture to aperture the range and interferometrically determined azimuth of the designated resolution target cell;
(f) compensating for phase variations in the received signals due to the respective motions of the radar bearing aircraft and the ship;
(g) steering the pointing of the interferometer antenna boresight to provide radar illumination of the ship target;
(h) controlling the range sampling timing so that corresponding range samples from pulse-to-pulse over the coherent integration interval correspond to the same range increment of the ship target;
(i) applying to the cursor location on an aperture to aperture basis a tracking correction to compensate for the rotation of the ship about the axis orthogonal to both the aircraft horizontal cross line-of-sight velocity and the radar line-of-sight to the center of rotation tracking point of the ship; and
(j) processing the compensated received signals by:
(1) measuring interferometrically the compensated received signals for each doppler filter in each range bin;

(2) plotting as interferometer azimuth angle versus filter doppler frequency the measured data for each doppler frequency in each range bin;
(3) performing a straight line fit to the plotted data points of the azimuth angle/doppler distribution for each range bin;
(4) determining the slope of the straight line fit to the azimuth angle/doppler distribution for each range bin;
(5) averaging the slope values determined over all range bins;
(6) obtaining from the averaged slope value and estimate of the net doppler producing cross line-of-sight velocity the radar bearing aircraft relative to the ship; and
(7) excluding any data points located outside a prescribed threshold band about the straight line fit formed from all available data points of the azimuth angle/doppler distribution for each range bin and refitting to the data after such exclusion.

7. In combination with an airborne synthetic aperture radar system including a two section interferometer antenna operatively connected to the input of a two channel receiver and doppler processing system, and a display of range versus azimuth operatively connected to the output of said two channel receiver and doppler processing system, image signal processing means for forming with improved azimuth resolution a scaled range/azimuth image of a ship target under the influence of sea state conditions comprising:

(a) means for steering the pointing of the interferometer antenna boresight to provide radar illumination of the ship target;
(b) means for controlling the range sampling timing so that corresponding samples from pulse-to-pulse over the coherent integration interval correspond to the same range increment of the ship target;
(c) means for compensating for phase variations in the received signals due to the respective motions of the radar bearing aircraft and the ship;
(d) means for measuring interferometrically the compensated received signals for each doppler filter in each range bin;
(e) means for
(1) plotting as an interferometer azimuth angle versus doppler filter frequency the measured data for each doppler filter in each range bin;
(2) performing a weighted least squares linear regression straight line fit to the plotted data points of the azimuth angle/doppler distribution for each range bin;
(3) excluding any data points located outside of a prescribed threshold band about the straight line fit formed from all available data points of the azimuth angle/doppler distribution for each range bin and refitting to the data after such exclusion;
(4) determining the slope of the straight line fit to the azimuth angle/doppler distribution for each range bin; and
(5) averaging the slope values determined over all range bins;
(f) means for determining from the averaged slope value the values of predetermined system parameters including synthetic aperture radar integration time and doppler filter bandwidths;
(g) means for displaying the formed range/azimuth image of the ship target on the range versus azimuth display;
(h) means for cursoring a designated range/azimuth resolution cell of the displayed image of the ship target;
(i) means for tracking from aperture to aperture the designated resolution cell of the ship target and for applying to the cursor location on an aperture to aperture basis a tracking correction to compensate for the rotation of the ship about an axis orthogonal to both the aircraft horizontal cross line-of-sight velocity and the radar line-of-sight to the center of rotation tracking point of the ship.

* * * * *

UNITED STATES PATENT AND TRADEMARK OFFICE
CERTIFICATE OF CORRECTION

PATENT NO. : 4,546,354
DATED : October 8, 1985
INVENTOR(S) : SOL BOLES

It is certified that error appears in the above-identified patent and that said Letters Patent is hereby corrected as shown below:

Abstract, line 4, delete "a"
line 14, change "designate" to -- designated --
Col. 2, line 54, change "deter ining" to -- determining --
Col. 3, line 65, change "df/dΘ = 2 Vsin Θ/λ" to -- $df/d\bar{\Theta} = 2\ V\sin \Theta/\lambda$ -- line 66, change "Θ" to $\bar{\Theta}$ --

Col. 5, line 18, change "ΔΘ" to -- $\overline{\Delta\Theta}$ -- line 30, change "$\Delta\bar{\Theta} = \dfrac{\lambda}{2V_{yy}}\ f_d,$" to

-- $\Delta\bar{\Theta} = \dfrac{\lambda}{2V'_{yy}}\ f_d,$ -- line 35, change "ΔΘ" to -- $\overline{\Delta\Theta}$ --
Col. 6, line 47 and 48, change "e sential" to -- essential --
line 63, change "Θ" to -- η --
Col. 8, line 35, change "separat" to -- separate --
line 41, change "t" to -- to --
line 65, change "twoway" to -- two-way --

UNITED STATES PATENT AND TRADEMARK OFFICE
CERTIFICATE OF CORRECTION

PATENT NO. : 4,546,354
DATED : October 8, 1985
INVENTOR(S) : SOL BOLES

It is certified that error appears in the above-identified patent and that said Letters Patent is hereby corrected as shown below:

Col. 9, line 18, change "$\Delta\theta = \sin^{-1}[(\lambda/2\,\pi d)\phi]$" to
-- $\overline{\Delta\theta} = \sin^{-1}[(\lambda/2\,\pi d)\phi]$ --; change "$\Delta\theta$" to -- $\overline{\Delta\theta}$ --
line 33, change "Z3" to -- 23 --
line 49, change "ar" to -- are --

Signed and Sealed this

Eighteenth Day of November, 1986

*Attest:*

DONALD J. QUIGG

*Attesting Officer*  *Commissioner of Patents and Trademarks*